United States Patent [19]

Sakamoto et al.

[11] 4,011,921
[45] Mar. 15, 1977

[54] APPARATUS FOR GUIDING WARM AIR OBTAINED AFTER COOLING OF AN ENGINE IN A MOTORIZED TWO-WHEELED VEHICLE

[75] Inventors: Tuneaki Sakamoto, Shiki; Takeshi Hashimoto, Tachikawa, both of Japan

[73] Assignee: Honda Giken Kogyo Kabushiki Kaisha, Tokyo, Japan

[22] Filed: Aug. 29, 1975

[21] Appl. No.: 609,059

[30] Foreign Application Priority Data

Sept. 4, 1974  Japan ............................ 49-105599

[52] U.S. Cl. .............................................. 180/33 R
[51] Int. Cl.² ........................................ B62D 63/04
[58] Field of Search ................ 180/30, 33 R, 33 A, 180/35; 165/41, 44

[56] References Cited

UNITED STATES PATENTS

| 1,835,077 | 12/1931 | Nicholson | 180/30 |
| 2,071,761 | 2/1937 | Nicholson | 180/33 R |
| 2,781,859 | 2/1957 | Warren | 180/33 R |
| 2,792,899 | 5/1957 | Piatti | 180/33 R |
| 3,926,274 | 12/1975 | Morioka | 180/35 |

FOREIGN PATENTS OR APPLICATIONS

| 1,081,870 | 5/1953 | France | 165/44 |
| 950,111 | 9/1956 | Germany | 180/33 R |
| 412,839 | 2/1945 | Italy | 180/30 |
| 831,375 | 3/1960 | United Kingdom | 180/33 R |
| 138,714 | 2/1920 | United Kingdom | 180/30 |

*Primary Examiner*—Joseph F. Peters, Jr.
*Assistant Examiner*—Jack D. Rubenstein
*Attorney, Agent, or Firm*—Haseltine, Lake & Waters

[57] ABSTRACT

Apparatus for guiding a cooling air flow for an engine of a motorized two-wheeled vehicle having a vehicle body provided with an internal combustion engine and a blower for forcibly cooling the engine, the apparatus comprising a guide plate mounted behind the blower so that warm air obtained after cooling can be guided by the plate to the outside of the vehicle body. When the engine is water-cooled it is provided with a radiator at the front thereof and the blower is positioned between the radiator and the engine. The guide plate is positioned between the blower and the engine.

6 Claims, 3 Drawing Figures

APPARATUS FOR GUIDING WARM AIR OBTAINED AFTER COOLING OF AN ENGINE IN A MOTORIZED TWO-WHEELED VEHICLE

FIELD OF THE INVENTION

This invention relates to a guide apparatus for a motorized two-wheeled vehicle in which warm air obtained after forcible cooling of the engine is guided to the exterior of the vehicle body.

BACKGROUND

In general, in a motorized two-wheeled vehicle of the type having a vehicle body provided with an internal combustion engine and a blower for forcibly cooling the engine, a disadvantage arises in that, especially when the vehicle is driven at low speed or is stopped, warm air obtained after cooling is not diffused and directly affects the driver, the carburetor and other structure which is positioned therebehind. This leads to discomfort for the driver while the carburetor is brought to a poor operating condition.

SUMMARY OF THE INVENTION

An object of the present invention is to provide apparatus of the above type which is free from the disadvantages thereof.

According to the invention, there is provided a two-wheeled vehicle having a body, an internal combustion engine mounted on the body and a blower means for cooling the engine, the improvement comprising a guide plate adjacent the blower means to direct warm air obtained after cooling outside the vehicle body.

The guide plate is disposed between the blower means and the seat for the driver to prevent the warm air from reaching the driver. Additionally the guide plate is positioned to prevent the warm air from reaching the carburetor.

DETAILED DESCRIPTION

Figure 1:
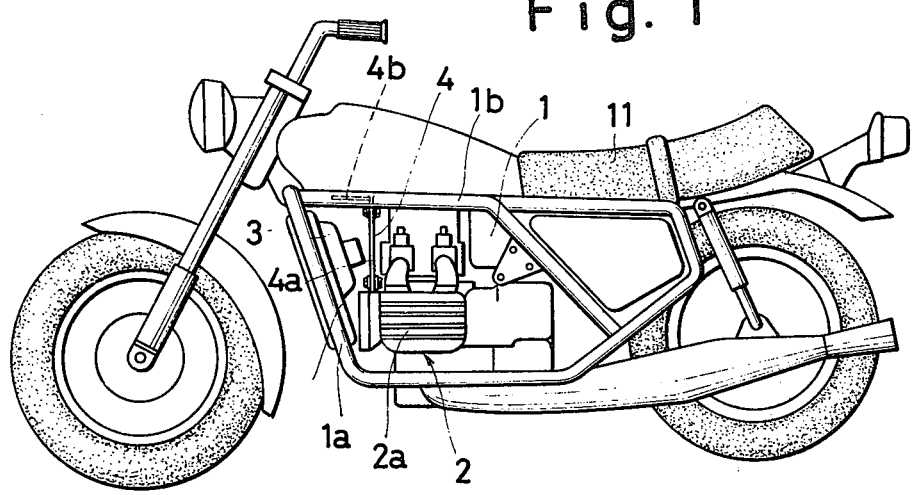
FIG. 1 is a side elevational view of a two wheel vehicle provided with apparatus according to one embodiment of this invention.
Figure 2:
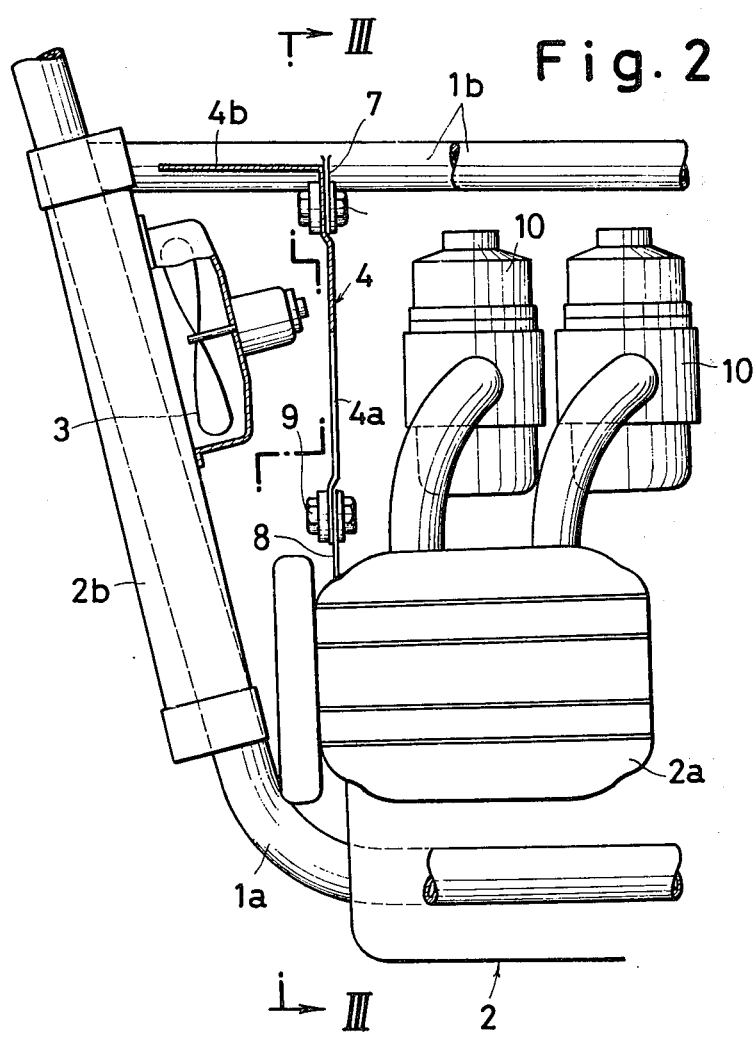
FIG. 2 is an enlarged side view of a major portion of the apparatus.
Figure 3:
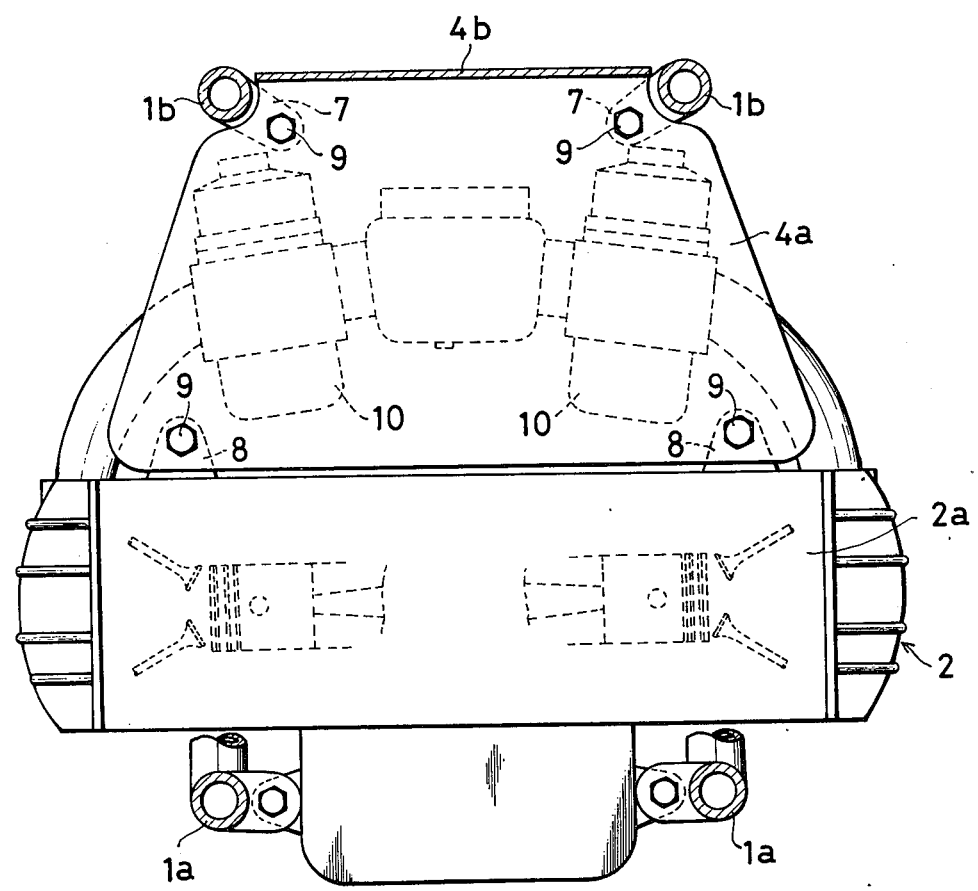
FIG. 3 is a sectional view taken along line III—III in FIG. 2.

Referring to the drawing, therein is seen a motorized two-wheeled vehicle having a frame or body 1 supporting an internal combustion engine 2 of horizontally opposing type and a blower 3 for forcibly cooling the engine 2. A guide plate 4 is mounted behind the blower 3 so that warm air obtained after a cooling operation is guided by plate 4 outside of the vehicle body 1.

The engine 2 is of water-cooled type comprising a main engine body 2a. A radiator 2b for water cooling of the engine is mounted in front of the engine body 2a and suitably connected thereto. The radiator 2b is supported between a pair of left and right tubular frame elements 1a, of the vehicle body 1 and the blower 3 is mounted on the rear surface of the radiator so that the radiator can be forcibly cooled by the blower 3. The guide plate 4 is positioned behind the blower 3.

The guide plate 4 comprises a vertical plate 4a extending from the upper surface of the main engine body 2a to upper pipes 1b of the frame, and a horizontal plate 4b extending forwards from the upper edge of the plate 4a between the pipes 1b.

Numerals 7 and 8 denote flanges projecting from the main pipes 1b and from the main engine body 2a, respectively, and the vertical plate 4a is secured to flanges 7 and 8 by means of respective bolts 9.

Numerals 10 denotes carburetors mounted on the upper portion of the main engine body 2a, and numeral 11 denotes a driver's seat secured in the middle of the upper portion of the vehicle body 1.

The operation is as follows:

The radiator 2b is forcibly cooled by the operation of the blower 2 and warm air obtained after cooling which is discharged rearwards is guided by the vertical plate 4a and the horizontal plate 4b to flow laterally at both sides of the vehicle body 1 for exterior discharge therefrom. Thus, even when the vehicle is driven at low speed or is stopped, the warm air is prevented from reaching the driver, the carburetors 10 and other structure positioned therebehind.

In the foregoing embodiment, the engine 2 is of water-cooled type having the radiator 2b in front thereof cooled by the blower 3 at the rear thereof. However, the invention is also applicable to the case in which the engine 2 is of air-cooled type and is directly cooled forcibly by blower 3 at the rear thereof.

Thus, according to this invention, the guide plate 4 is mounted behind the blower 3 so that warm air, after cooling, is guided by the guide plate 4 towards the outside of the vehicle body 1. Hence as explained before, even when the vehicle is driven at slow speed or is stopped, warm air after cooling will not reach the driver, the carburetors and other structure positioned therebehind. Thus the driver can continue driving comfortably and the carburetor can operate stably without being brought into poor operating condition. Thereby stable driving of the vehicle is achieved. Additionally, any other parts positioned behind the plate can be also prevented from being contacted by the warm air thereby eliminating any possibility of damage therefrom.

What is claimed is:

1. In a two-wheeled vehicle having a body, an internal combustion engine mounted on the body, and a blower means for cooling the engine, an improvment comprising a guide plate adjacent the blower means to direct warm air obtained after cooling outside the vehicle body, said engine being of water-cooled type and including a radiator mounted on the body in front of the engine, said blower means being on said radiator at the rear thereof in adjacent facing relation with said engine, said guide plate being between said engine and said blower means, said guide plate including a vertical portion rearwards of said blower means and a horizontal portion extending above said blower means, the body having spaced pipes above the engine, said vertical portion of the guide plate extending downwardly from the pipes, said horizontal portion extending forwardly said pipes.

2. An improvement as claimed in claim 1 wherein the vehicle has a seat for a driver, said guide plate being disposed between the blower means and the seat for the driver to prevent the warm air from reaching the driver.

3. An improvement as claimed in claim 1 wherein said vertical portion has an upper edge, said horizontal portion extending forwardly at said upper edge.

4. An improvement as claimed in claim 1 wherein said engine is of horizontally opposing type and includes a carburetor disposed behind the guide plate.

5. An improvement as claimed in claim 1 comprising means securing said guide plate to said frame and to said engine.

6. An improvement as claimed in claim 1 wherein said guide plate is secured to said pipes and extends therebetween.

* * * * *